US011525416B2

(12) United States Patent
Mohammed et al.

(10) Patent No.: US 11,525,416 B2
(45) Date of Patent: Dec. 13, 2022

(54) APPARATUS, SYSTEM AND METHOD FOR THERMAL MANAGEMENT BY DEPLOYING ENGINE FUELING ON DEMAND

(71) Applicant: Cummins Inc., Columbus, IN (US)

(72) Inventors: Hasan Mohammed, Charleston, SC (US); Jeffrey S. O'Neill, Elizabethtown, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/502,291

(22) Filed: Oct. 15, 2021

(65) Prior Publication Data
US 2022/0034273 A1 Feb. 3, 2022

Related U.S. Application Data

(63) Continuation of application No. PCT/US2020/028695, filed on Apr. 17, 2020.
(Continued)

(51) Int. Cl.
*F02D 41/02* (2006.01)
*F01N 9/00* (2006.01)
(Continued)

(52) U.S. Cl.
CPC .......... *F02D 41/0245* (2013.01); *F01N 9/00* (2013.01); *F01N 11/002* (2013.01); *F02D 33/006* (2013.01); *F02D 2200/101* (2013.01)

(58) Field of Classification Search
CPC ............. F02D 41/0245; F02D 41/1446; F02D 41/3863; F02D 41/3845; F02D 33/006;
(Continued)

(56) References Cited

U.S. PATENT DOCUMENTS

| 7,523,606 B2 | 4/2009 | Strauser et al. |
| 8,230,679 B2 | 7/2012 | Frazier et al. |

(Continued)

FOREIGN PATENT DOCUMENTS

| KR | 10-1004870-61 | 12/2010 |
| WO | WO-2009/055060 A2 | 4/2009 |

OTHER PUBLICATIONS

International Search Report and Written Opinion for International Application No. PCT/US2020/028695, dated Jul. 16, 2020, 9 pages.

*Primary Examiner* — Audrey B. Walter
*Assistant Examiner* — Dapinder Singh
(74) *Attorney, Agent, or Firm* — Foley & Lardner LLP (57) ABSTRACT

A method includes receiving information indicative of a temperature of exhaust gas emitted from an engine operating at an engine speed, determining that the temperature of the exhaust gas is below a predefined temperature threshold, determining an engine load sized to increase the temperature of the exhaust gas above the predefined temperature threshold, increasing a load on the engine to the determined engine load while maintaining the engine at the engine speed by increasing at least one of a fuel flow rate and a fuel flow pressure of the fuel pump powered by the engine, and diverting the excess fuel from the fuel flow path upstream of the engine. Increasing at least one of the fuel flow rate and the fuel pressure of the fuel pump causes excess fuel to be provided to the engine than is necessary to maintain the engine at the engine speed.

20 Claims, 4 Drawing Sheets

Related U.S. Application Data

(60) Provisional application No. 62/835,744, filed on Apr. 18, 2019.

(51) Int. Cl.
*F01N 11/00* (2006.01)
*F02D 33/00* (2006.01)

(58) Field of Classification Search
CPC ......... F02D 2200/101; F02D 2041/026; F01N 9/00; F01N 11/002; F01N 11/00; F01N 3/021; F01N 3/10; F01N 3/103; F01N 3/105; F01N 3/02; F01N 3/20; F01N 3/24; F01N 2560/06; Y02T 10/12; Y02T 10/40
See application file for complete search history.

(56) References Cited

U.S. PATENT DOCUMENTS

| | | |
|---|---|---|
| 2003/0106309 A1 | 6/2003 | Morimoto et al. |
| 2004/0244770 A1 | 12/2004 | Surnilla et al. |
| 2011/0126519 A1 | 6/2011 | Okada |
| 2011/0138792 A1 | 6/2011 | Keusen et al. |
| 2013/0275029 A1 | 10/2013 | Schwarz et al. |
| 2013/0291517 A1 | 11/2013 | Kowalkowski et al. |
| 2015/0176515 A1 | 6/2015 | Barber et al. |
| 2019/0162132 A1* | 5/2019 | Sugimoto ............... F02M 39/02 |
| 2019/0178198 A1* | 6/2019 | Okamura ............... F02M 59/10 |
| 2020/0248644 A1* | 8/2020 | Nakamura ............... F02D 41/40 |

* cited by examiner

APPARATUS, SYSTEM AND METHOD FOR THERMAL MANAGEMENT BY DEPLOYING ENGINE FUELING ON DEMAND

CROSS-REFERENCE TO RELATED APPLICATIONS

This application is a continuation of International Application No. PCT/US2020/028695, filed Apr. 17, 2020, which claims priority to U.S. Provisional Application No. 62/835,744, filed Apr. 18, 2019, both of which are incorporated herein by reference in their entireties.

TECHNICAL FIELD

The present disclosure relates to managing a health of catalysts used in exhaust aftertreament systems. More particularly, the present disclosure relates to an apparatus, system, and method for maintaining a temperature of engine exhaust gas at or above one or more temperature threshold values to promote healthy catalyst operating conditions.

BACKGROUND

Emissions regulations for internal combustion engines have become more stringent over recent years. Environmental concerns have motivated the implementation of stricter emission requirements for internal combustion engines throughout much of the world. Government agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems receive an exhaust gas emitted by an engine and generally include one or more catalysts that reduce an emission of particulate matter, nitrogen oxides (NOx), hydrocarbons, and other environmentally harmful pollutants. Engine operation at undesirable conditions (low temperature) can result in build-up of various species in components of an exhaust aftertreatment system in exhaust gas receiving communication with the engine. For example, various species can build up in the catalysts and the reductant piping systems. Subsequent performance deterioration can only be reversed with periodic high temperature operation at various temperature thresholds depending on the species that has accumulated. Therefore, maintaining desirable exhaust gas temperatures may promote improved operation of the exhaust aftertreatment system.

SUMMARY

One embodiment relates to a method. The method includes receiving information indicative of a temperature of exhaust gas emitted from an engine operating at an engine speed below a predetermined speed threshold or a low engine load. The method includes determining that the temperature of the exhaust gas is below a predefined temperature threshold. The method includes determining an engine load structured to increase the temperature of the exhaust gas above the predefined temperature threshold. The method includes increasing a load on the engine to the determined engine load while maintaining the engine at the engine speed by increasing at least one of a fuel flow rate and a fuel flow pressure of a fuel pump powered by the engine. Increasing at least one of the fuel flow rate and the fuel flow pressure of the fuel pump causes excess fuel to be provided to the engine than is necessary to maintain the engine at the commanded engine speed. The method includes diverting, by a fuel metering device, the excess fuel from a fuel flow path of the fuel upstream of the engine.

In some embodiments, the fuel flow pressure is increased to a maximum pressure achievable at the low engine speed.

In some embodiments, increasing the fuel flow rate includes determining an increased fuel flow rate structured to provide a target fuel flow pressure and a target exhaust gas temperature.

In some embodiments, the fuel flow rate is increased to a maximum fuel flow rate achievable at the engine speed.

In some embodiments, the engine speed is an idle engine speed.

In some embodiments, the information indicative of the temperature of the exhaust is received in real-time or substantially real-time.

In some embodiments, increasing the load on the engine includes continuously manipulating at least one of the fuel flow rate and the fuel flow pressure in real-time or substantially real-time.

Another embodiment relates to a system. The system includes a fuel pump, a fuel metering device, and a controller. The fuel pump is powered by an engine and structured to provide fuel to the engine along a fuel flow path. The fuel metering device is positioned along the fuel flow path and structured to divert excess fuel from the fuel flow path of the fuel upstream of the engine. The controller is structured to receive information indicative of a temperature of exhaust gas emitted from the engine operating at an engine speed. The controller is structured to determine that the temperature of the exhaust gas is below a predefined temperature threshold. The controller is structured to determine an engine load sized to increase the temperature of the exhaust gas above the predefined temperature threshold. The controller is structured to increase a load on the engine to the determined engine load while maintaining the engine at the engine speed by increasing at least one of a fuel flow rate and a fuel flow pressure of the fuel pump powered by the engine. Increasing at least one of the fuel flow rate and the fuel flow pressure of the fuel pump causes excess fuel to be provided to the engine than is necessary to maintain the engine at the engine speed. The controller is structured to divert the excess fuel from the fuel flow path of the fuel upstream of the engine.

In some embodiments, the fuel flow pressure is increased to a maximum pressure achievable at the engine speed.

In some embodiments, increasing the fuel flow rate includes determining an increased fuel flow rate structured to provide a target fuel flow pressure and a target exhaust gas temperature.

In some embodiments, the fuel flow rate is increased to a maximum flow rate achievable at the engine speed.

In some embodiments, the engine speed is an idle engine speed.

In some embodiments, the controller is structured to receive information of the temperature of the exhaust gas in real-time or substantially real-time.

In some embodiments, the controller is structured to continuously manipulate least one of a fuel flow rate and a fuel flow pressure of the pump powered by the engine.

Another embodiment relates to an apparatus. The apparatus includes a catalyst health management (CHM) circuit and a load generation circuit. The CHM circuit is structured to receive information indicative of a temperature of exhaust gas emitted from an engine and determine that the temperature of the exhaust gas is below a predefined temperature threshold. The load generation circuit is structured to determine an engine load that increases the temperature of the exhaust gas above the predefined temperature threshold. The load generation circuit is structured to increase a load on the engine to the determined engine load while maintaining the engine at a particular engine speed by increasing at least one of a fuel flow rate or a fuel flow pressure of a fuel pump. Increasing the at least one of the fuel flow rate or the fuel flow pressure of the fuel pump causes excess fuel to be provided to the engine than is necessary to maintain the engine at the particular engine speed. The load generation circuit is structured to control a fuel metering device to divert excess fuel from the fuel flow path of the fuel upstream of the engine.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for dynamically determining a temperature of an exhaust gas and changing a load of a fuel pump fluidly coupled with an engine to increase the temperature of the exhaust gas. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for managing a health of one or more components of an exhaust aftertreatment system of a vehicle in which an engine of the vehicle is operating under conditions in which the engine emits exhaust gas having a low temperature. If these conditions are prolonged, the temperature of the exhaust gas emitted by the engine under these operating conditions is generally too low to promote healthy operation of one or more components of the exhaust aftertreatment system. Examples of conditions that tend to lead to the engine emitting exhaust gas having a low temperature include, but are not limited to, an idle operating mode, motoring at low engine speeds, and/or operating under a low engine load. When the engine is operating at an idle speed or a low engine speed, and what may compound the low exhaust gas temperature situation, a governor may be provided that prevents the engine from operating at a higher speed, which then prevents exhaust gas temperatures from increasing. In another example, the engine condition that tends to lead to the engine emitting exhaust gas having a low temperature includes conditions in which the speed of the engine is operating at medium speed and/or medium load engine operating conditions.

According to the present disclosure, a controller of the vehicle increases a power requirement of one or more parasitic devices that are powered by the engine to increase the load on the engine to, for example, a target engine load structured to increase a temperature of the exhaust gas generated by the engine. In particular, in one embodiment, the controller is structured to increase a load of a fuel pump on the engine to generate engine exhaust gas at or approximately at a predefined temperature threshold. The predefined temperature threshold is a temperature or range of temperatures at which the temperature of the exhaust gas is high enough for thermal management of the components of the exhaust aftertreatment system. The controller is structured to increase the load on the fuel pump by increasing a pressure of the fuel in the fuel pumping system and/or increasing a pumping rate of the fuel pump. In such an embodiment, the increased pump load causes the pump to provide an excess amount of fuel to the engine. Accordingly, the fuel pumping system further includes an excess fuel recirculation line structured to divert the excess fuel back to the fuel tank. The excess fuel recirculation line includes an excess fuel recirculation valve. The vehicle controller is structured to modulate or control the excess fuel recirculation valve together with an optional fuel cooler prior to returning the fuel back to the fuel tank to direct the excess fuel to travel back to the fuel tank. As described herein, the present disclosure may be used as a diagnostic/prognostic feature as well as for preventative care. Thus, the present disclosure is widely applicable and beneficial to exhaust gas aftertreatment systems.

As used herein, the term "excess amount of fuel" refers to an amount of fuel that is provided to the engine that is greater than the amount of fuel required for the engine to operate at a target engine load or target exhaust gas temperature. As also used herein, and with respect to a called-out component of the exhaust aftertreatment system, the term "healthy" means that the component of the exhaust aftertreatment is operating as intended. As there is a variety of different components with different functions in an exhaust aftertreatment system, "healthy" or "operating as intended" may vary from component to component. For example, a catalyst of the exhaust aftertreatment system may be considered "healthy" if no fault codes or alerts (e.g., a malfunction indicator light) that are specific to operation of that catalyst are currently generated or being provided. For example, a NOx conversion efficiency or NOx amount out of the vehicle over a predefined time period may be conditions that are specific to certain fault codes or indicator lights regarding operation of a SCR catalyst. If the NOx conversion efficiency is below a threshold value, the SCR catalyst may not be operating as intended (not healthy). Or, if a fault code specific to the SCR catalyst is triggered, the SCR catalyst may not be operating as intended (not healthy). As another example, an ammonia slip amount above a predefined threshold amount may also be indicative of an unhealthy SCR catalyst. Vice versa, ammonia slip below the predefined threshold amount may be indicative of a healthy SCR catalyst. Thus, specific conditions (NOx amount out, NOx conversion efficiency, ammonia slip amount, particulate matter accumulation amount, and so on) with or without the presence of fault codes or other indicators being generated may alone or in combination be used to determine whether a component of an exhaust aftertreatment system is "healthy" or operating as intended. As another example, a particulate matter sensor may determine that the particulate matter emission is above a threshold value and determine that the DPF may be unhealthy (or, below the value, and determine that the DPF may be healthy). As another example, a particulate sensor or other type of sensor may determine that non-catalyst components of the exhaust system, such as reductant piping, are partially or fully blocked with urea deposits. As still another example, low load or other operating conditions for the vehicle that promote low exhaust gas temperatures that exist for a predefined amount of time may also be used to determine whether one or more components, such as the SCR catalyst, may be healthy. Low temperatures inhibit the NOx reactions of the SCR catalyst, such that low temperatures existing for more than a predefined period of time can be indicative of the SCR catalyst not operating as intended.

Figure 1:
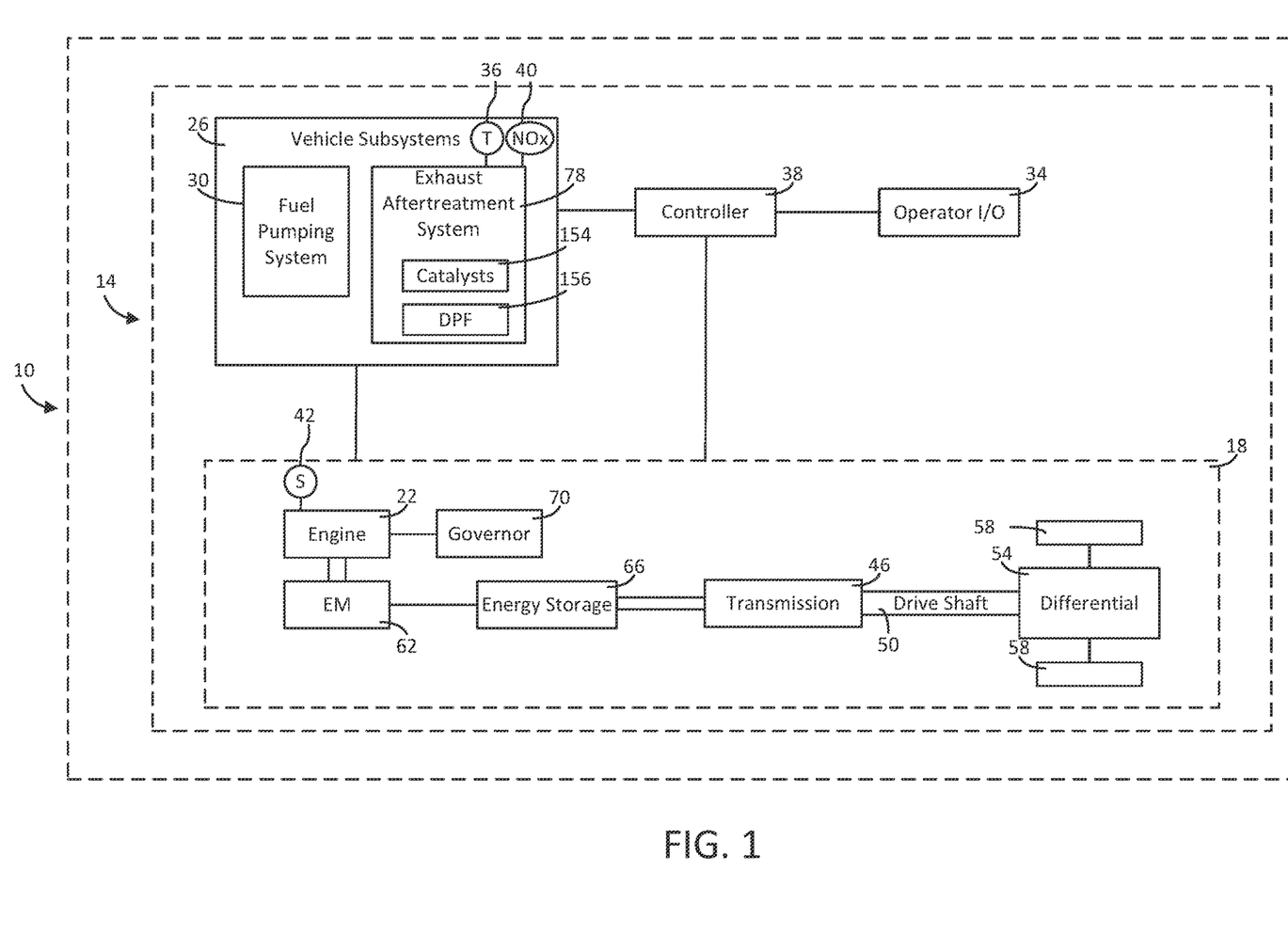
FIG. 1 is a schematic representation of a vehicle having a controller according to an example embodiment.

As shown in FIG. 1, a vehicle 10 includes an engine system 14 that includes a powertrain 18 including an engine 22, vehicle subsystems 26, such as a fuel pumping system 30, an operator input/output (I/O) device 34, sensors communicably coupled to one or more components of the engine 22 and/or communicably coupled to one or more components of the vehicle subsystems 26, and a controller 38. The vehicle 10 may be an on-road or off-road vehicle including, but not limited to, line-haul trucks, mid-range trucks (e.g. pickup truck), buses, refuse vehicle trucks, and any other type of vehicle or industrial powertrain equipment.

The operator I/O device 34 may enable an operator of the vehicle 10 (or passenger or manufacturing, service, or maintenance personnel) to communicate with the vehicle 10 and the controller 38. For example, the operator I/O device 34 may allow an operator of the vehicle 10 to input a command signal to the components of the vehicle 10. By way of example, the operator I/O device 34 may include, but is not limited to, an interactive display, a touchscreen device, one or more buttons and switches, voice command receivers, and the like. In another embodiment, the operator I/O device 34 may also include a brake pedal or a brake lever, an accelerator pedal, a steering wheel, and/or an accelerator throttle.

Components of the vehicle 10 may communicate with each other or other components separate from the vehicle 10 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 38 is communicably coupled to the systems and components in the vehicle 10 of FIG. 1, the controller 38 is structured to receive data regarding one or more of the components shown in FIG. 1. For example, the data may include operation data regarding the operating conditions of the powertrain 18, the engine 22, a fuel pumping system 30, and/or other components (e.g., a motor, a generator, a regenerative braking system, etc.) acquired by one or more sensors. For example, the data may include temperature data determined by a temperature sensor 36 positioned at or proximate an exhaust manifold of the engine 22 or at or proximate an inlet of the exhaust aftertreatment system 78. As another example, the data may include NOx data determined by one or more NOx sensors 40 positioned at various locations of the exhaust aftertreatment system 78. As another example, the data may include engine speed data determined by a speed sensor 42 of the engine 22. The controller 38 may determine how to control the powertrain 18, the engine 22, the fuel pumping system 30, and/or other components (e.g., a motor, a generator, a regenerative braking system, etc.) based on the operation data.

As shown in FIG. 1, the powertrain 18 includes the engine 22, a transmission 46, a driveshaft 50, an axle differential 54, a final drive 58, an electromagnetic device 62 (e.g., a generator, a motor-generator, etc.), and an energy storage device 66. The engine 22 may be structured as any engine type, including a spark-ignition internal combustion engine, a compression-ignition internal combustion engine, and/or a fuel cell, among other alternatives. The engine 22 may be powered by any fuel type (e.g., diesel, ethanol, gasoline, natural gas, propane, hydrogen, etc.). Similarly, the transmission 46 may be structured as any type of transmission, such as a continuous variable transmission, a manual transmission, an automatic transmission, an automatic-manual transmission, a dual clutch transmission, and so on. The engine 22 includes a governor 70. The governor 70 is structured to maintain the engine 22 at or below a predefined speed independent of a load on the engine 22. The governor 70 can be any type of governor, such as a mechanical governor, a power-assisted governor, a hydraulic governor, a pneumatic governor, an electric governor, and so on.

Like the engine 22 and the transmission 46, the driveshaft 50, the axle differential 54, and/or the final drive 58 may be structured in any configuration dependent on the application (e.g., the final drive 58 is structured as wheels in an automotive application and a propeller in a boat application, etc.). Further, the driveshaft 50 may be structured as any type of driveshaft including, but not limited to, a one-piece, two-piece, and a slip-in-tube driveshaft based on the application.

As shown in FIG. 1, the engine 22 and the electromagnetic device 62 are mechanically coupled together (e.g., via a shaft, a gear box, etc.). In some embodiments, the electromagnetic device 62 is a single device having both generating and motoring capabilities. In some embodiments, the electromagnetic device 62 has only generating capabilities. According to an example embodiment, the engine 22 is structured to drive the electromagnetic device 62 to generate electrical energy. As shown in FIG. 1, the electromagnetic device 62 is electrically coupled to the energy storage device 66 such that the electromagnetic device 62 may provide energy generated thereby to the energy storage device 66 for storage. In some embodiments, the electromagnetic device 62 is structured to receive stored electrical energy from the energy storage device 66 to facilitate operation thereof. By way of example, the electromagnetic device 62 may receive stored electrical energy from the energy storage device 66 to facilitate starting the engine 22.

Referring still to FIG. 1, the vehicle 10 includes vehicle subsystems 26. In the illustrated embodiment, the vehicle subsystems 26 include the fuel pumping system 30 and an exhaust aftertreatment system 78. The vehicle subsystems 26 may include other components including mechanically driven or electrically driven vehicle components (e.g., HVAC system, lights, pumps, fans, etc.).

The exhaust aftertreatment system 78 is in exhaust gas-receiving communication with the engine 22. According to the depicted embodiment, the engine 22 is structured as a compression-ignition internal combustion engine that utilizes diesel fuel. However, as mentioned herein, in various alternate embodiments, the engine 22 may be structured as any other type of engine (e.g., spark-ignition) that utilizes any type of fuel (e.g., gasoline, natural gas). Within the engine 22, air from the atmosphere is combined with fuel, and combusted, to power the engine 22. Combustion of the fuel and air in the compression chambers of the engine 22 produces exhaust gas that is operatively vented to the exhaust manifold and to the exhaust aftertreatment system 78.

The exhaust aftertreatment system 78 can include one or more exhaust aftertreatment catalysts 154 and other components for treating the generated exhaust gas from the engine 22 such that less harmful compounds are eventually expelled into the environment. The exhaust aftertreatment catalysts 154 can include one or more of a diesel oxidation catalyst (DOC), a selective catalytic reduction (SCR) catalyst, and optionally an ammonia oxidation (AMOx) catalyst. The exhaust aftertreatment system 78 can also include a diesel particulate filter (DPF) 156. The exhaust aftertreatment system 78 may also include a reductant delivery system (not shown) structured to deliver a reductant to the exhaust gas travelling through exhaust aftertreatment system 78. The reductant delivery system is selectively controllable to inject reductant directly into the exhaust gas prior to entering the SCR catalyst. In some embodiments, the reductant may either be ammonia or DEF, which decomposes to produce ammonia. The ammonia reacts with NOx in the presence of the SCR catalyst to reduce the NOx to less harmful emissions, such as $N_2$ and $H_2O$. The NOx in the exhaust gas includes $NO_2$ and NO. Generally, both $NO_2$ and NO are reduced to $N_2$ and $H_2O$ through various chemical reactions driven by the catalytic elements of the SCR catalyst in the presence of reductant. The exhaust aftertreatment catalysts 154 and the DPF 156 are structured to remove harmful compounds in the exhaust (e.g., by filtration, chemical reactions, etc.) and may need to be periodically regenerated to burn off the captured constituents.

Thermal management of exhaust aftertreatment system 78 and components thereof refers to various devices and processes to manipulate component temperatures for a desired result, such as burning off exhaust gas constituents from a catalyst. One particular thermal management technique includes increasing the engine load so that the engine 22 can produce exhaust gas having a temperature high enough to burn the captured constituents off of the various exhaust aftertreatment catalysts 154 and the DPF 156. Another particular thermal management technique includes operating the one or more exhaust aftertreatment catalysts 154 at a temperature high enough for efficient operation, and/or to facilitate adsorption of the DEF to the one or more exhaust aftertreatment catalysts 154 for a predefined time period. Still another thermal management technique includes implementing and using a dedicated heater to maintain exhaust aftertreatment component temperatures at or above a predefined threshold. These thermal management techniques are beneficial to improving and maintaining desired operation of the exhaust aftertreatment system 78.

Figure 2:
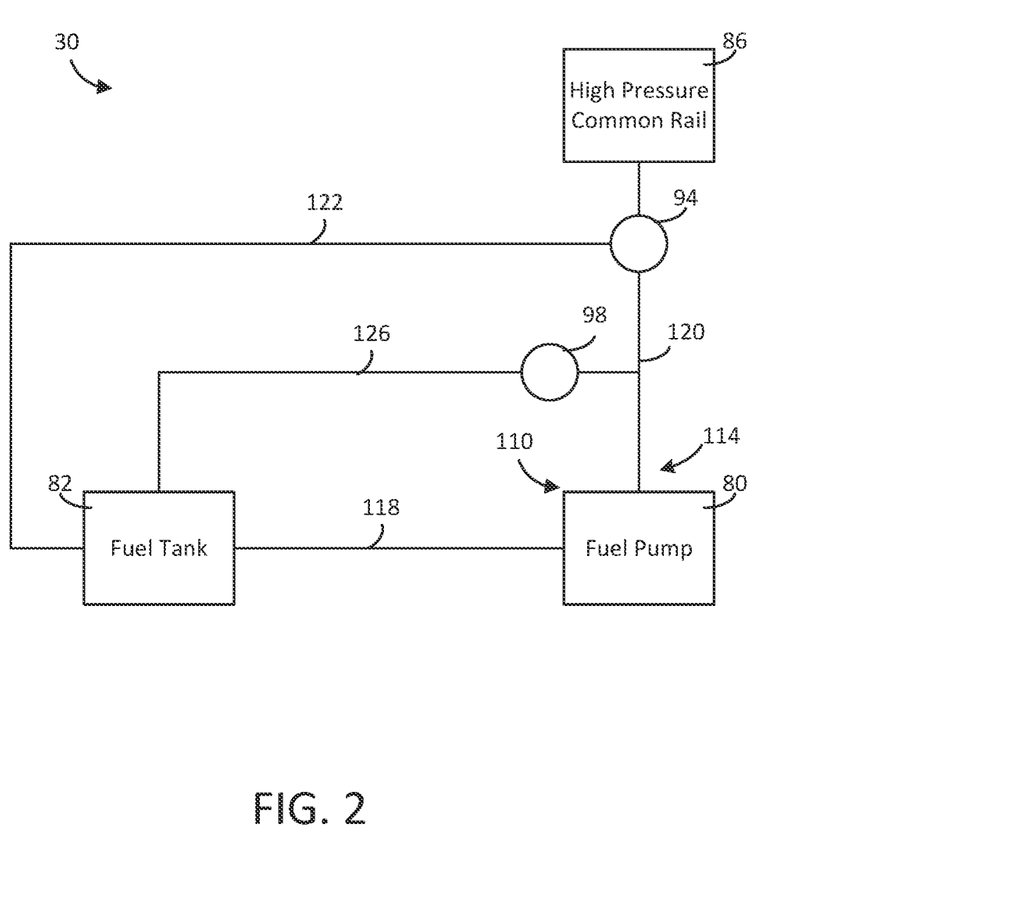
FIG. 2 is a schematic representation of a fuel pumping system of the vehicle of FIG. 1 according to an example embodiment.

Referring now to FIG. 2, the fuel pumping system 30 includes a fuel pump 80, a fuel tank 82, a high pressure common rail 86, a pressure relief valve 94, and an excess fuel recirculation valve 98. In some embodiments, the fuel pump 80 is coupled to the engine 22 and is driven by the engine 22. In other embodiments, the fuel pump 80 is powered by an alternator. The fuel pump 80 includes an inlet or low pressure side 110 and an outlet or high pressure side 114. The low pressure side 110 is coupled to the fuel tank 82 by a low pressure flow path, such as piping 118.

The high pressure side 114 is coupled to the high pressure common rail 86 by a high pressure flow path, such as piping 120. The high pressure common rail 86 includes a plurality of fuel injectors, each structured to inject fuel into a particular cylinder of the engine 22. The pressure relief valve 94 is positioned along the high pressure flow path 120 between the fuel pump 80 and the high pressure common rail 86. The pressure relief valve 94 is positionable to allow or prevent access to a pressure relief flow path, such as piping 122. Under high pressure conditions, the pressure relief valve 94 opens to allow the excess fuel to flow though the pressure relief valve 94 and into the piping 122. The fuel can then flow through the piping 122 to the fuel tank 82. The excess fuel recirculation valve 98 is positioned along the high pressure flow path 120 between the fuel pump 80 and the high pressure common rail 86. In other embodiments, the excess fuel recirculation valve 98 may be positioned in different locations, such as along a portion of the piping 126. The excess fuel recirculation valve 98 is positionable to meter an amount of fuel that can flow to a recirculation flow path, such as piping 126, which is coupled to fuel tank 82. The excess fuel recirculation valve 98 is positionable to allow excess fuel flow to return to the fuel tank 82 and fuel pressure to decrease to a fuel pressure appropriate for the engine 22 before fuel is delivered to the fuel injectors.

On the low pressure side 110, fuel flows from the fuel tank 82 to the fuel pump 80. The fuel is then pumped by the fuel pump 80. Downstream of the fuel pump 80 represents, accordingly, the high pressure side 114. After exiting the fuel pump 80, fuel flows along the piping 118 towards the high pressure common rail 86. Under conditions in which the fuel pump 80 is pumping an excess amount of fuel, the controller 38 positions the excess fuel recirculation valve 98 to allow fuel to flow through the excess fuel recirculation valve 98 to the piping 126. The fuel can then flow through the piping 126 to the piping 122 and back to the fuel tank 82.

In some embodiments, the excess fuel recirculation valve 98 is actuated by a solenoid. The solenoid can actuate the excess fuel recirculation valve 98 between an open position in which fuel is allowed to flow through the excess fuel recirculation valve 98 to the fuel recirculation flow path and a closed position in which fuel is prevented from flowing through the excess fuel recirculation valve 98. In some embodiments, the excess fuel recirculation valve 98 can be held at any position in between the open position and the closed position to control the flow of fuel.

While a variety of different types of valve structures are possible, in the example shown, the excess fuel recirculation valve 98 includes a first orifice having a first orifice diameter and a second orifice having a second orifice diameter that is larger than the first orifice diameter. The first orifice and the second orifice are positionable by a solenoid such that fuel can flow through one of the first orifice or the second orifice to enter the piping 126. The solenoid can position the excess fuel recirculation valve 98 so that fuel flows through the first orifice to the piping 126 to reduce an amount of fuel that flows through the excess fuel recirculation valve 98. The solenoid can position the excess fuel recirculation valve 98 so that the fuel flows through the second orifice to the piping 126 to increase an amount of fuel that flows through the excess fuel recirculation valve 98. In other embodiments, the excess fuel recirculation valve 98 can be a poppet valve, a butterfly valve, or another type of valve. Further, actuation of the excess fuel recirculation valve 98 may be accomplished via different means than the aforementioned described solenoid in one or more embodiments.

As the components of FIGS. 1-2 are shown to be embodied in the vehicle 10, the controller 38 may be structured as one or more electronic control units (ECU). The controller 38 may be separate from or included with at least one of a transmission control unit, an exhaust aftertreatment control unit, a powertrain control module, an engine control module, etc. The function and structure of the controller 38 is described in greater detail in FIG. 3.

Figure 3:
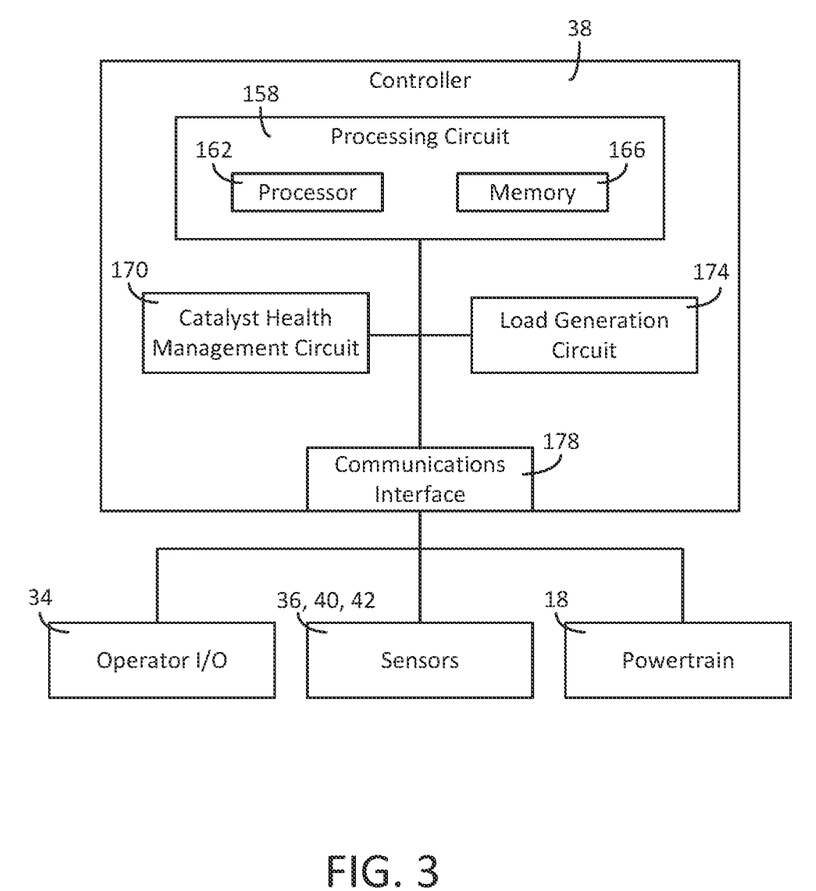
FIG. 3 is a schematic representation of the controller of the vehicle of FIG. 1 according to an example embodiment.

Referring now to FIG. 3, a schematic diagram of the controller 38 of the vehicle 10 of FIG. 1 is shown according to an example embodiment. As shown in FIG. 3, the controller 38 includes a processing circuit 158 having a processor 162 and a memory device 166, a catalyst health management (CHM) circuit 170, a load generation circuit 174, and the communications interface 178. Generally, the controller 38 is structured control a load on the engine 22 to maintain a temperature of the exhaust gas exiting the engine 22 above a predefined temperature threshold. More specifically, the controller 38 is structured to control at least one of an amount and a pressure of fuel pumped to a high pressure flow path by the fuel pump 80 to increase a load on the engine 22 in response to determining that a temperature of the exhaust gas is below the predefined temperature threshold, and/or in response to a condition of the vehicle 10 (or system, component thereof, etc.) that is indicative of a condition that produces low exhaust temperatures for a time longer than a predefined time period or otherwise indicates that thermal management of the exhaust aftertreatment system 78 may be desirable.

In one configuration, the CHM circuit 170 and the load generation circuit 174 are embodied as machine or computer-readable media that is executable by a processor, such as processor 162. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the CHM circuit 170 and the load generation circuit 174 are embodied as hardware units, such as electronic control units. As such, the CHM circuit 170 and the load generation circuit 174 may be embodied as one or more circuitry components including, but not limited to, processing circuitry, network interfaces, peripheral devices, input devices, output devices, sensors, etc. In some embodiments, the CHM circuit 170 and the load generation circuit 174 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the CHM circuit 170 and the load generation circuit 174 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The CHM circuit 170 and the load generation circuit 174 may also include programmable hardware devices such as field programmable gate arrays, programmable array logic, programmable logic devices or the like. The CHM circuit 170 and the load generation circuit 174 may include one or more memory devices for storing instructions that are executable by the processor(s) of the CHM circuit 170 and the load generation circuit 174. The one or more memory devices and processor(s) may have the same definition as provided herein with respect to the memory device 166 and processor 162. In some hardware unit configurations, the CHM circuit 170 and the load generation circuit 174 may be geographically dispersed throughout separate locations in the vehicle 10. Alternatively, and as shown, the CHM circuit 170 and the load generation circuit 174 may be embodied in or within a single unit/housing, which is shown as the controller 38.

In the example shown, the controller 38 includes a processing circuit 158 having a processor 162 and a memory device 166. The processing circuit 158 may be structured or structured to execute or implement the instructions, commands, and/or control processes described herein with respect to the CHM circuit 170 and the load generation circuit 174. The depicted configuration represents the CHM circuit 170 and the load generation circuit 174 as machine or computer-readable media. However, as mentioned above, this illustration is not meant to be limiting as the present disclosure contemplates other embodiments where the CHM circuit 170 and the load generation circuit 174 or at least one circuit of the CHM circuit 170 and the load generation circuit 174 is structured as a hardware unit. All such combinations and variations are intended to fall within the scope of the present disclosure.

The processor 162 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the CHM circuit 170 and the load generation circuit 174 may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 166 (e.g., RAM, ROM, Flash Memory, hard disk storage, etc.) may store data and/or computer code for facilitating the various processes described herein. The memory device 166 may be communicably coupled to the processor 162 to provide computer code or instructions to the processor 162 for executing at least some of the processes described herein. Moreover, the memory device 166 may be or include tangible, non-transient volatile memory or non-volatile memory. Accordingly, the memory device 166 may include database components, object code components, script components, or any other type of information structure for supporting the various activities and information structures described herein.

The communications interface 178 may include wired and/or wireless interfaces (e.g., jacks, antennas, transmitters, receivers, transceivers, wire terminals, etc.) for conducting data communications with various systems, devices, or networks. For example, the communications interface 178 may include an Ethernet card and port for sending and receiving data via an Ethernet-based communications network and/or a Wi-Fi transceiver for communicating via a wireless communications network. The communications interface 178 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 178 of the controller 38 may facilitate communication between and among the controller 38 and one or more components of the vehicle 10 (e.g., components of the powertrain 18, the vehicle subsystems 26, the operator I/O device 34, the sensors 36, 40, 42, etc.). Communication between and among the controller 38 and the components of the vehicle 10 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The CHM circuit 170 is structured to receive information indicative of a health of one or more of the components of the exhaust aftertreatment system 78, such as a health of the exhaust aftertreatment catalysts 154 or a health of the DPF 156. As alluded to above, information indicative of the health of one or more of the exhaust aftertreatment catalysts 154 can include a NOx concentration downstream of any of the exhaust aftertreatment catalysts 154, an amount of time since a previous thermal management event, exhaust gas temperatures and/or temperature trends over a predefined period of time, an exhaust gas particulate matter concentration over a predefined period of time, fault codes, illumination of malfunction indication lights, etc. The CHM circuit 170 is structured to determine, based on this information, whether thermal management is required. In other embodiments, thermal management events can be initiated on a schedule. In such an embodiment, the CHM circuit 170 is structured to monitor an amount of time that the engine 22 has been operating and/or an amount of time since a last thermal management event. The CHM circuit 170 is structured to determine that a thermal management event is required in response to the time that the engine 22 has been operating and/or the time since the last thermal management event has exceeded a predefined time threshold. In response to determining that thermal management is required, the CHM circuit 170 is structured to receive information indicative of a temperature of the exhaust gas. In some embodiments, the CHM circuit 170 is structured to receive information indicative of the temperature of the exhaust gas in real-time or in substantially real-time. Information indicative of a low temperature of the exhaust gas can include a speed of the engine 22 (which is indicative of a load on the engine 22), information indicative of a temperature proximate the exhaust gas manifold, etc. The CHM circuit 170 is structured to determine a temperature of the exhaust gas based on the information indicative of the temperature of the exhaust gas. The CHM circuit 170 is structured to compare the temperature of the exhaust gas to a low temperature threshold. In embodiments in which the information indicative of conditions that produce low temperature exhaust gas includes the speed of the engine 22, the CHM circuit 170 is structured to compare the speed of the engine 22 to a predefined speed threshold. In response to the speed of the engine 22 being below the predefined speed threshold for a predefined period of time, the CHM circuit 170 is structured to determine that the engine 22 is in a low temperature exhaust gas producing situation. Exemplary low temperature exhaust gas producing situations include an idle mode and low speed and/or low load engine operating conditions. When the engine 22 is in the idle mode, the governor 70 prevents the speed of the engine 22 from increasing above a predefined idle speed threshold. In response to determining that the speed of the engine 22 is below a predefined low speed motoring threshold for a predefined period of time, the CHM circuit 170 is structured to determine that the engine 22 is in a low speed motoring mode. During the low speed motoring mode, the governor 70 can prevent the speed of the engine 22 from exceeding a predefined threshold. In another example, the speed of the engine 22 can be below the predefined speed threshold when the engine 22 is operating at medium speed and/or medium load engine operating conditions.

When the engine 22 is generating exhaust gas that is below the predefined temperature threshold for the predefined period of time, a temperature of the exhaust gas is or likely is too low for the components of the exhaust aftertreatment system 78 (e.g., the exhaust aftertreatment catalysts 154 and/or the DPF 156) to undergo thermal management. Such conditions can occur when the engine 22 is operating with a low load (e.g., the idle mode, a low speed motoring mode, low torque, etc.). In response to determining that the engine 22 is generating exhaust gas that is below the predefined temperature threshold for the predefined period of time, the CHM circuit 170 activates the load generation circuit 174. In embodiments in which the engine 22 is operating at medium speeds and/or under medium loads, the load generation circuit 174 can supplement thermal management by other vehicle components, such as a wastegate and/or a variable geometry turbocharger. In response to determining that the temperature of the exhaust gas is at or above the predefined temperature threshold, the CHM circuit 170 does not activate the load generation circuit 174.

The load generation circuit 174 is structured to determine an engine load at which the engine 22 can generate exhaust gas having a temperature at or above a predefined thermal management temperature threshold. Exhaust temperatures at or above the predefined thermal management threshold refer to temperatures that are at least one of high enough to burn captured constituents off of the exhaust aftertreatment catalysts 154 and the DPF 156 (e.g., to regenerate the exhaust aftertreatment catalysts 154 and the DPF 156), cause operation the exhaust aftertreatment catalysts 154 in an efficient temperature range, and/or facilitate adsorption of reductant onto one or more of the exhaust aftertreatment catalysts 154. As used herein, the phrase "parasitic load" refers to an amount of torque required to power components of the vehicle 10 that are not related to propelling the vehicle 10. Such components can include the fuel pump 80, air compressors, fans, etc.

The load generation circuit 174 is structured to determine a target engine load at which a temperature of the exhaust gas is at or approximately at the predefined thermal management temperature threshold. For example, in some embodiments, the load generation circuit 174 can determine the target engine load based on a look-up table, a mathematical model, or an algorithm. Since the engine 22 is operating in an idle mode, the load generation circuit 174 is structured to increase a parasitic load of the engine 22 so that the engine 22 can operate at the target engine load without increasing the engine speed.

In some embodiments, the load generation circuit 174 is structured to increase the parasitic load on the engine 22 by increasing a load of the fuel pump 80 on the engine 22 to operate the engine 22 at the target engine load without changing the engine speed. The load generation circuit 174 is structured to determine the target amount of pump work to increase the engine load to the target engine load. For example, in some embodiments, the load generation circuit 174 can be structured to subtract the current engine load from the target engine load to determine the target pump load. The target pump load can be determined based on Equation 1:

$$\text{Target Pump Load} = \frac{W_P}{\eta_P}, \quad (1)$$

where $W_P$ is the work done by the fuel pump 80 and $\eta_P$ is the pump efficiency. The pump work can be determined based on Equation 2:

$$W_P = \dot{V} \times \Delta P \quad (2),$$

where $\dot{V}$ is the volumetric flow rate of fuel through the fuel pump 80 and $\Delta P$ is the change in pressure across the fuel pump 80. As shown in Equation 2, the amount of work done by the fuel pump 80 can increase by increasing a pressure of the fuel in the fuel pumping system 30 and/or increasing a flow rate of fuel provided by the fuel pump 80. The load generation circuit 174 is structured to determine a target fuel pressure provided by the fuel pump 80 based on the speed of the engine 22. In such embodiments, the load generation circuit 174 can receive information indicative of the speed from the engine 22, such as engine speed data determined by the speed sensor 42. In some embodiments, the target fuel pressure can be a maximum fuel pressure for the speed of the engine 22. The load generation circuit 174 can determine the target fuel pressure based on a look-up table, a model, an algorithm, etc. based on the engine speed.

The load generation circuit 174 is structured to determine a target pumping rate for the fuel pump 80 based on the target fuel pressure, the target temperature, and/or the target engine load. The target fuel pumping rate is a pump flow rate at which, based on the target pressure, the actual load on the engine 22 will or likely will reach the target engine load to generate exhaust gas at the target exhaust gas temperature. In some embodiments, the load generation circuit 174 can determine the target pump flow rate based on a look-up table, a mathematical model, an algorithm, etc. For example, substituting Equation 2 into Equation 1 and rearranging yields the following equation:

$$\dot{V} = \frac{(W_P)(\eta_P)}{\Delta P}. \quad (3)$$

The target fuel pumping rate can be determined based on Equation 4:

$$\text{target fuel pumping rate} = \frac{\delta * \dot{V}}{(\text{mg fuel per stroke})(n)}, \quad (4)$$

where $\delta$ is the density of the fuel and n is the number of cylinders in the engine 22 that are being fired.

In embodiments in which the load generation circuit 174 is structured to operate the fuel pump 80 at a maximum pressure, the load generation circuit 174 is structured to manipulate the fuel pumping rate to operate the engine 22 at the target engine load. In other embodiments, the load generation circuit 174 is structured to manipulate both the pressure of the fuel pump 80 and the fuel pumping rate to operate the engine 22 at the target engine load. In some embodiments, the load generation circuit 174 is structured to continuously adjust the load on the engine 22 by manipulating the fuel pumping rate and/or the pressure of the fuel pump 80 in real-time or substantially real-time.

The load generation circuit 174 is structured to command the fuel pump 80 to operate at the determined pressure and pumping rate to operate the engine 22 at the target engine load. Operating the fuel pump 80 at the associated the target engine load causes the fuel pump 80 to pump more fuel than is required to operate the engine 22 at the engine speed to increase the temperature of the exhaust gas produced by the engine 22 while operating the engine 22 at the engine speed. Exemplary engine speeds include the idle speed, the medium engine speed, the speed commanded by the operator, and/or the torque commanded by the operator. The load generation circuit 174 is structured to open the excess fuel recirculation valve 98, which allows the excess fuel to flow through the piping 126 to return to the fuel tank 82.

Figure 4:
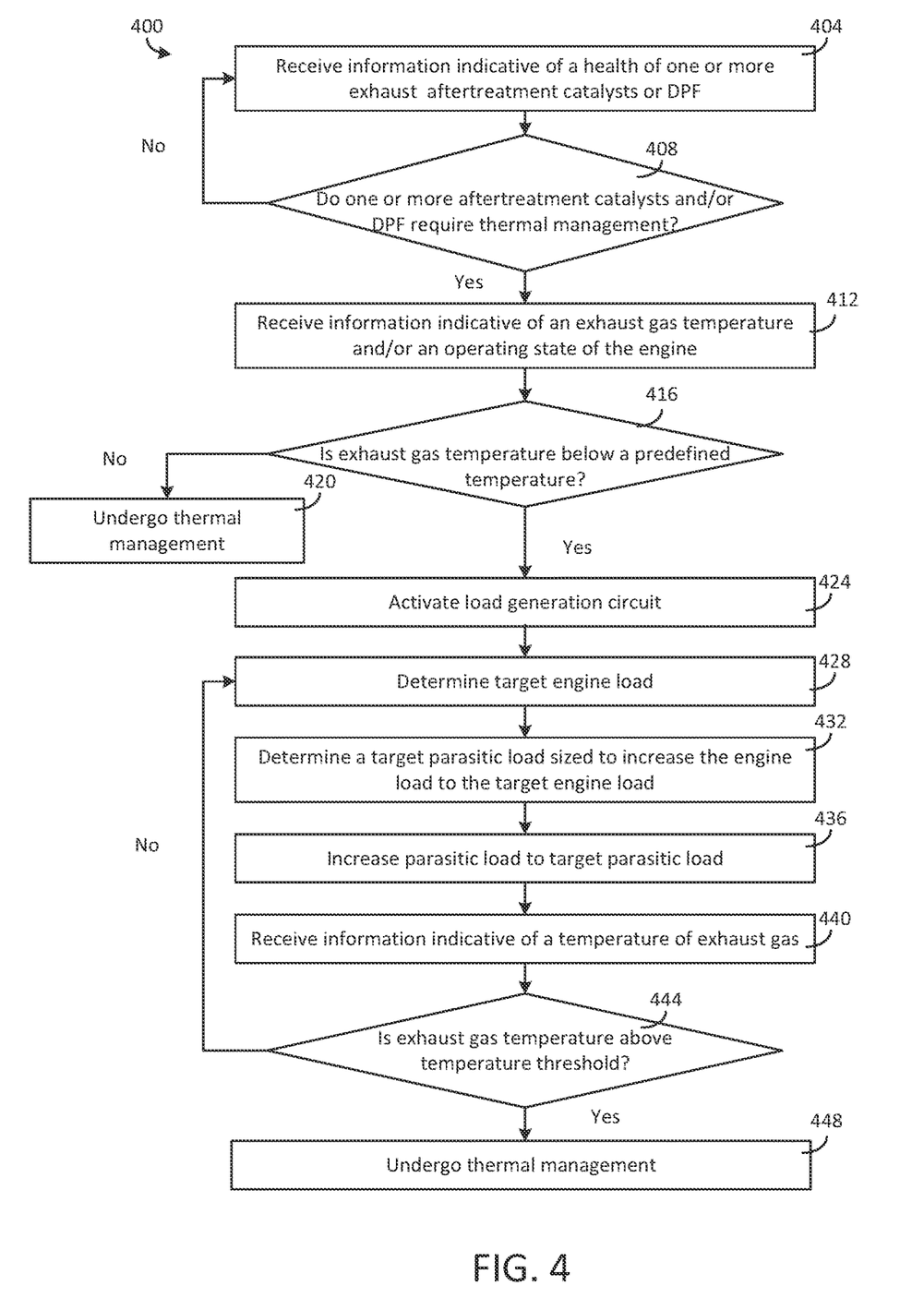
FIG. 4 is a flow diagram of a method of modulating and, particularly increasing, a load on an engine to increase a temperature of exhaust gas generated and expelled by the engine operating under conditions that produce low temperature exhaust gas, according to an example embodiment.

FIG. 4 illustrates an exemplary method 400 for operating the fuel pump 80 to increase a load on the engine 22 to a target load sized to increase a temperature of exhaust gas generated by the engine 22 operating at an engine speed and an engine load. The engine speed can be an idle engine speed, a low engine speed, and/or a medium engine speed. The engine load can be a low engine load and/or medium engine load. Low engine loads occur when the engine 22 is operating at a low engine speed, an idle engine speed and/or at a low torque. Medium engine loads occur when the engine 22 is motoring at slow to medium speeds and/or with low to medium loads. At step 404, the CHM circuit 170 receives information indicative of a health of one or more of the components of the exhaust aftertreatment system 78, such as the exhaust aftertreatment catalysts 154 and/or the DPF 156. At step 408, the CHM circuit 170 determines whether the one or more exhaust aftertreatment catalysts 154 and/or the DPF 156 are unhealthy. In response to determining that the exhaust aftertreatment catalysts 154 and the DPF 156 are healthy, the method returns to step 404. At step 412, in response to determining that one or more of the exhaust aftertreatment catalysts 154 or the DPF 156 require thermal management, the CHM circuit 170 receives information indicative of a temperature of the exhaust gas produced by the engine 22. At step 416, the CHM circuit 170 compares the temperature of the exhaust produced by the engine 22 to a predefined temperature threshold. In some embodiments, the CHM circuit 170 receives the information indicative of the temperature of the exhaust gas produced by the engine 22 in real-time or in substantially real-time. At step 420, in response to determining that the engine 22 is not operating below the predefined temperature threshold, the CHM circuit 170 commands the engine 22 to produce exhaust gas at higher temperatures to undergo thermal management of one or more of the exhaust aftertreatment catalysts 154 or other components (e.g., the DPF 156). At step 424, in response to determining that the engine 22 is operating at a temperature below the predefined temperature threshold, the CHM circuit 170 activates the load generation circuit 174.

At step 428, the load generation circuit 174 determines a target engine load at which the engine 22 can generate exhaust gas at or proximate the predefined exhaust gas temperature threshold. For example, the load generation circuit 174 can determine the target engine load based on a look-up table, a mathematical model, an algorithm, etc. At step 432, the load generation circuit 174 determines a target parasitic load to increase the engine load to the target engine load. For example, the load generation circuit 174 can determine a target fuel pressure and/or a target fuel pumping rate for the fuel pump 80 based on a look-up table, a mathematical model, and/or an algorithm. The load generation circuit 174 adjusts the load on the engine 22 by manipulating either one or both of fuel flow rate through the fuel pump 80 and the fuel pressure demanded from the fuel pump 80. Increasing the fuel pressure and the fuel flow rate simultaneously causes an increase of the load on the engine 22. In some embodiments, the load generation circuit 174 continuously adjusts the load on the engine 22. In this situation, the load generation circuit 174 opens the excess fuel recirculation valve 98 to enable excess fuel (from the increased fuel flow rate and/or pressure) to return to the fuel tank 82. In this regard, fuel pressure is decreased to levels appropriate for the engine 22 before the fuel is delivered to the fuel injectors. At step 436, the load generation circuit 174 increases the parasitic load to the target parasitic load. For example, the load generation circuit 174 operates the fuel pump 80 at the target pump load. In this manner, the load generation circuit 174 can increase a temperature of the exhaust gas produced by the engine 22 while operating the engine 22 at the engine speed. Exemplary engine speeds include the idle speed, the medium engine speed, the speed commanded by the operator, and/or the torque commanded by the operator. At step 440, the load generation circuit 174 receives information indicative of a temperature of the exhaust gas. At step 444, the load generation circuit 174 determines whether the temperature of the exhaust gas is above the predefined temperature threshold. In response to determining that the temperature of the exhaust gas is below the predefined temperature threshold, the load generation circuit 174 returns to step 428. At step 448, in response to determining that the temperature of the exhaust gas is above the predefined temperature threshold, the load generation circuit 174 commands the engine 22 to undergo thermal management.

In some embodiments, the CHM circuit 170 receives information indicative of the temperature of the exhaust gas in real-time or substantially real-time and compares the information indicative of the exhaust gas to the predefined temperature threshold in real-time or substantially real-time. In response to determining that the temperature of the exhaust gas is below the predefined temperature threshold, the controller 38 repeats steps 432-444.

As described above, the method 400 increases a temperature of exhaust gas generated by an engine 22 operating at idle engine speeds, low engine speeds, low engine loads, medium speeds, and/or medium engine loads by operating the fuel pump 80 to increase a load on the engine 22 to a target load. In contrast, conventional exhaust aftertreatment systems can include actuators solely intended to increase a temperature of the exhaust gas on-demand during low load engine operating conditions. Such actuators can include intake or exhaust throttle valves that are structured to increase a backpressure on the engine, thereby increasing a load on the engine to increase a temperature of the exhaust gas. These actuators are not used during motoring, and only are included in engine systems to increase a temperature of the exhaust gas when the engine is idling or otherwise operating to produce low exhaust gas temperatures. While effective for their purpose, these actuators add cost and complexity to the exhaust aftertreatment system. Therefore, the present disclosure may reduce complexity in the system, which may lead to various gained efficiencies, such as an ease of implementation, a reduction in additional component failure possibilities, and so on.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 3, it should be understood that the controller 38 may include any number of circuits for completing the functions described herein. For example, the activities and functionalities of the circuits 170 and 174 may be combined in multiple circuits or as a single circuit. Additional circuits with additional functionality may also be included. Further, the controller 38 may further control other activity beyond the scope of the present disclosure.

As mentioned above and in one configuration, the "circuits" may be implemented in machine-readable medium for execution by various types of processors, such as the processor 162 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any component or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving information indicative of a temperature of exhaust gas emitted from an engine operating at least one of an engine speed below a predefined speed threshold or a low engine load;
   determining that the temperature of the exhaust gas is below a predefined temperature threshold;
   determining an engine load structured to increase the temperature of the exhaust gas above the predefined temperature threshold;
   increasing a load on the engine to the determined engine load while maintaining the engine at the engine speed and increasing at least one of a fuel flow rate and a fuel flow pressure of a fuel pump powered by the engine, wherein the increasing at least one of the fuel flow rate and the fuel flow pressure of the fuel pump causes excess fuel to be provided to the engine than is necessary to maintain the engine at the commanded engine speed; and
   diverting the excess fuel from a fuel flow path of the fuel upstream of the engine.

2. The method of claim 1, wherein the fuel flow pressure is increased to a maximum pressure achievable at the engine speed.

3. The method of claim 1, wherein the increasing of the fuel flow rate includes determining an increased fuel flow rate structured to provide a target fuel flow pressure and a target exhaust gas temperature.

4. The method of claim 1, wherein the fuel flow rate is increased to a maximum flow rate achievable at the engine speed.

5. The method of claim 1, wherein the engine speed is an idle engine speed.

6. The method of claim 1, wherein the information indicative of the temperature of the exhaust is received in real-time or substantially real-time.

7. The method of claim 6, wherein increasing the load on the engine includes continuously manipulating at least one of the fuel flow rate and the fuel flow pressure in real-time or substantially real-time.

8. A system comprising:
   a fuel pump powered by an engine and structured to provide fuel to the engine along a fuel flow path;
   a fuel recirculation valve positioned along the fuel flow path and structured to divert excess fuel from the fuel flow path of the fuel upstream of the engine; and
   a controller structured to:
     receive information indicative of a temperature of exhaust gas emitted from the engine operating at an engine speed;
     determine that the temperature of the exhaust gas is below a predefined temperature threshold;
     determine an engine load sized to increase the temperature of the exhaust gas above the predefined temperature threshold;
     increase a load on the engine to the determined engine load while maintaining the engine at the engine speed and increasing at least one of a fuel flow rate and a fuel flow pressure of the fuel pump powered by the engine, wherein increasing at least one of the fuel flow rate and the fuel flow pressure of the fuel pump causes excess fuel to be provided to the engine than is necessary to maintain the engine at the engine speed; and
     divert the excess fuel from the fuel flow path of the fuel upstream of the engine.

9. The system of claim 8, wherein the fuel flow pressure is increased to a maximum pressure achievable at the engine speed.

10. The system of claim 9, wherein the increasing of the fuel flow rate includes determining an increased fuel flow rate structured to provide a target fuel flow pressure and a target exhaust gas temperature.

11. The system of claim 9, wherein the fuel flow rate is increased to a maximum flow rate achievable at the engine speed.

12. The system of claim 9, wherein the engine speed is an idle engine speed.

13. The system of claim 9, wherein the controller is structured to receive information of the temperature of the exhaust gas in real-time or substantially real-time.

14. The system of claim 13, wherein the controller is structured to continuously manipulate least one of a fuel flow rate and a fuel flow pressure of the fuel pump powered by the engine.

15. An apparatus comprising:
a catalyst health management (CHM) circuit structured to:
receive information indicative of a temperature of exhaust gas emitted from an engine; and
determine that the temperature of the exhaust gas is below a predefined temperature threshold; and
a load generation circuit structured to:
determine an engine load that increases the temperature of the exhaust gas above the predefined temperature threshold;
increase a load on the engine to the determined engine load while maintaining the engine at a particular engine speed and increasing at least one of a fuel flow rate or a fuel flow pressure of a fuel pump, wherein increasing the at least one of the fuel flow rate or the fuel flow pressure of the fuel pump causes excess fuel to be provided to the engine than is necessary to maintain the engine at the particular engine speed; and
control a fuel recirculation valve to divert excess fuel from the fuel flow path of the fuel upstream of the engine.

16. The apparatus of claim 15, wherein the load generation circuit is structured to increase the fuel flow pressure to a maximum pressure and/or a maximum flow rate achievable at the particular engine speed.

17. The apparatus of claim 15, wherein the increasing of the fuel flow rate includes determining an increased fuel flow rate structured to provide a target fuel flow pressure and a target exhaust gas temperature.

18. The apparatus of claim 15, wherein the particular engine speed is an idle engine speed.

19. The apparatus of claim 15, wherein the CHM circuit is structured to receive information of the temperature of the exhaust gas in real-time or substantially real-time.

20. The apparatus of claim 15, wherein the load generation circuit is structured to continuously manipulate least one of a fuel flow rate or a fuel flow pressure of the fuel pump powered by the engine.

\* \* \* \* \*